United States Patent
Zhou et al.

(10) Patent No.: US 12,232,651 B2
(45) Date of Patent: Feb. 25, 2025

(54) SYSTEMS FOR GRIND DURATION ADJUSTMENT FOR GRINDERS

(71) Applicants: Haier US Appliance Solutions, Inc., Wilmington, DE (US); Qianmao Zhou, Shanghai (CN)

(72) Inventors: Qianmao Zhou, Shanghai (CN); Shanfeng Ding, Shanghai (CN); Bo Yan, Shanghai (CN); Xingde Kang, Shanghai (CN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/799,562

(22) PCT Filed: May 6, 2022

(86) PCT No.: PCT/CN2022/091142
§ 371 (c)(1),
(2) Date: Aug. 12, 2022

(87) PCT Pub. No.: WO2023/212909
PCT Pub. Date: Nov. 9, 2023

(65) Prior Publication Data
US 2024/0180366 A1    Jun. 6, 2024

(51) Int. Cl.
*A47J 42/08* (2006.01)
*A47J 42/06* (2006.01)
*A47J 42/18* (2006.01)

(52) U.S. Cl.
CPC .............. *A47J 42/08* (2013.01); *A47J 42/06* (2013.01)

(58) Field of Classification Search
CPC ............. A47J 42/08; A47J 42/06; A47J 42/18
See application file for complete search history.

(56) References Cited

U.S. PATENT DOCUMENTS

| | | | |
|---|---|---|---|
| 9,427,110 B2 | 8/2016 | Hoare et al. | |
| 2007/0187534 A1* | 8/2007 | Anson | A47J 42/46 241/92 |
| 2019/0254464 A1 | 8/2019 | Oddera | |
| 2019/0365155 A1* | 12/2019 | Mazzer | A47J 42/16 |
| 2020/0187706 A1* | 6/2020 | Rossetto | A47J 31/56 |
| 2021/0219782 A1 | 7/2021 | Jebb et al. | |

FOREIGN PATENT DOCUMENTS

| | | | | |
|---|---|---|---|---|
| CN | 101778586 A | | 7/2010 | |
| CN | 102883642 A | | 1/2013 | |
| CN | 205597755 U | | 9/2016 | |
| CN | 107411583 A | * | 12/2017 | .............. A47J 42/16 |

(Continued)

OTHER PUBLICATIONS

English translate (CN107411583A), retrieved date Jun. 21, 2024.*

(Continued)

*Primary Examiner* — Mohammed S. Alawadi
(74) *Attorney, Agent, or Firm* — Dority & Manning, P.A.

(57) ABSTRACT

A grinding system that includes a grinder attached to a grind size adjustment ring. Also, a potentiometer attached to the grind size adjustment ring, so as to provide a grind size measurement to a controller. The controller selects a grinding duration based upon the selected grind size measured by the potentiometer.

5 Claims, 5 Drawing Sheets

(56) References Cited

FOREIGN PATENT DOCUMENTS

| | | | |
|---|---|---|---|
| CN | 107692874 | A | 2/2018 |
| CN | 110312456 | A | 10/2019 |
| CN | 110740666 | A | 1/2020 |
| CN | 111615351 | A | 9/2020 |
| CN | 114269212 | A | 4/2022 |
| EP | 3718446 | A1 * | 10/2020 ............ A47J 42/08 |

OTHER PUBLICATIONS

English translate (EP3718446A1), retrieved date Jun. 21, 2024.*
International Search Report Corresponding to Application No. PCT/CN2022/091142 on Jan. 20, 2023.

* cited by examiner

SYSTEMS FOR GRIND DURATION ADJUSTMENT FOR GRINDERS

CROSS-REFERENCE TO RELATED APPLICATIONS

The present application is the National Stage Entry of and claims the benefit of priority under 35 U.S.C. § 371 to PCT Application Serial No. PCT/CN2022/091142 filed May 6, 2022 and entitled SYSTEMS FOR GRIND DURATION ADJUSTMENT FOR GRINDERS, which is hereby incorporated by reference in its entirety.

FIELD OF THE INVENTION

The present subject matter relates generally to systems for adjusting the grinding duration of grinders.

BACKGROUND OF THE INVENTION

A coffee grinder is used for grinding roasted coffee beans. Coffee grinders may feature different style of blades or burrs to accomplish the grinding. Certain coffee grinders are able to adjust the grinding size, or distance between the blades or burrs, to produce coarse or fine coffee grounds. For instance, if making espresso, the grounds should be fine, or for French press the coffee grounds should be larger or coarse grounds.

When brewing coffee, a specific weight of coffee grounds to ounces of water ratio for brewing the coffee is typically recommended. The incorrect weight of grounds in this ratio has an adverse effect on the quality of the coffee. Coffee grinders tend to grind coffee beans using the same grinding duration for different grind sizes, such as coarse grinding and fine grinding. However, using the same grinding duration for coarse and fine grinding leads to a higher or lower respective yield of coffee grounds. Thus, the user is left with the incorrect weight of grounds when producing coffee. Thus, the user either wastes overproduced coffee grounds or runs the grinder apparatus again, until the desired weight of coffee grounds is reached.

BRIEF DESCRIPTION OF THE INVENTION

Aspects and advantages of the invention will be set forth in part in the following description, or may be apparent from the description, or may be learned through practice of the invention.

In one example embodiment, a system includes a grinder, a grind size adjustment ring configured for changing a grind size value of the grinder, and a potentiometer rotatably coupled to the grind size adjustment ring. The potentiometer is configured to output the grind size value, based upon a measured rotation of the grind size adjustment ring. The system also includes a controller configured to adjust a grinding duration based upon the grind size value. Each grinding duration corresponds to a respective single grind size value.

In another example embodiment, a system includes a grinder, a user interface, a controller, a grind size adjustment ring, and a stepper motor operatively connected to the grind size adjustment ring such that the grind size adjustment ring is rotatable by the stepper motor. The stepper motor is configured for rotating the grind size selector through a pulse input from the controller. The controller is configured to receive a grinding size from the user interface, which dictates the number the pulse inputs needed for the stepper motor.

In another exemplary embodiment, a system includes a grinder comprising an upper annular ring and a lower annular ring, a controller configured for choosing a grind duration based upon a grind size value, and an optical sensor coupled to the upper annular ring and the lower annular ring. The optical sensor configured for measuring a distance between the upper annular ring and the lower annular ring. The measured distance corresponds to the grind size value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
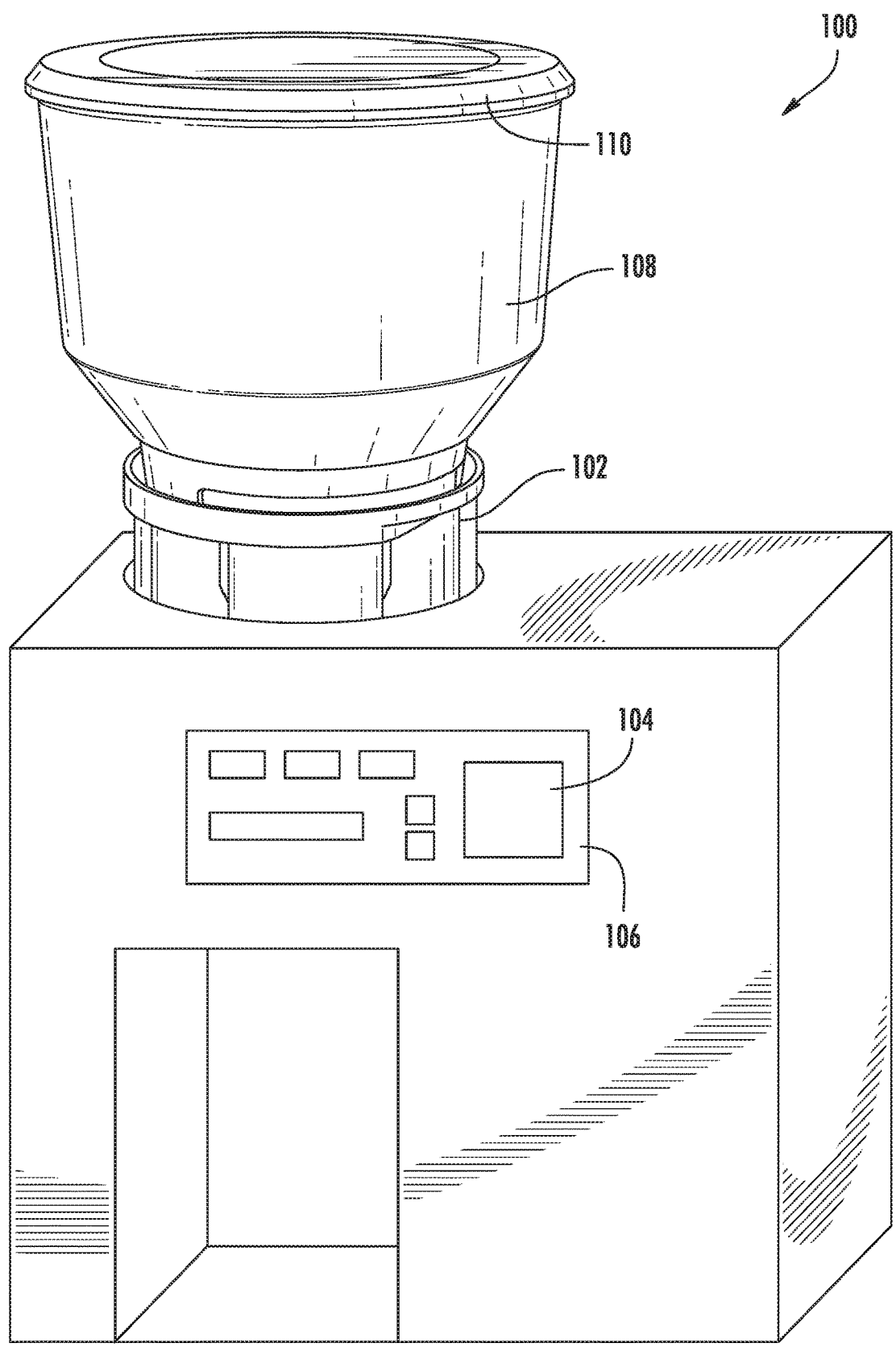
FIG. 1 is a perspective view of a system according to an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Referring now to the figures, an example coffee grinding system 100 in FIG. 1 is provided for example purposes only. It would be appreciated by one skilled in the art that, in general, other embodiments of a coffee grinder system could have other configurations, shapes, sizes, etc.

Figure 2:
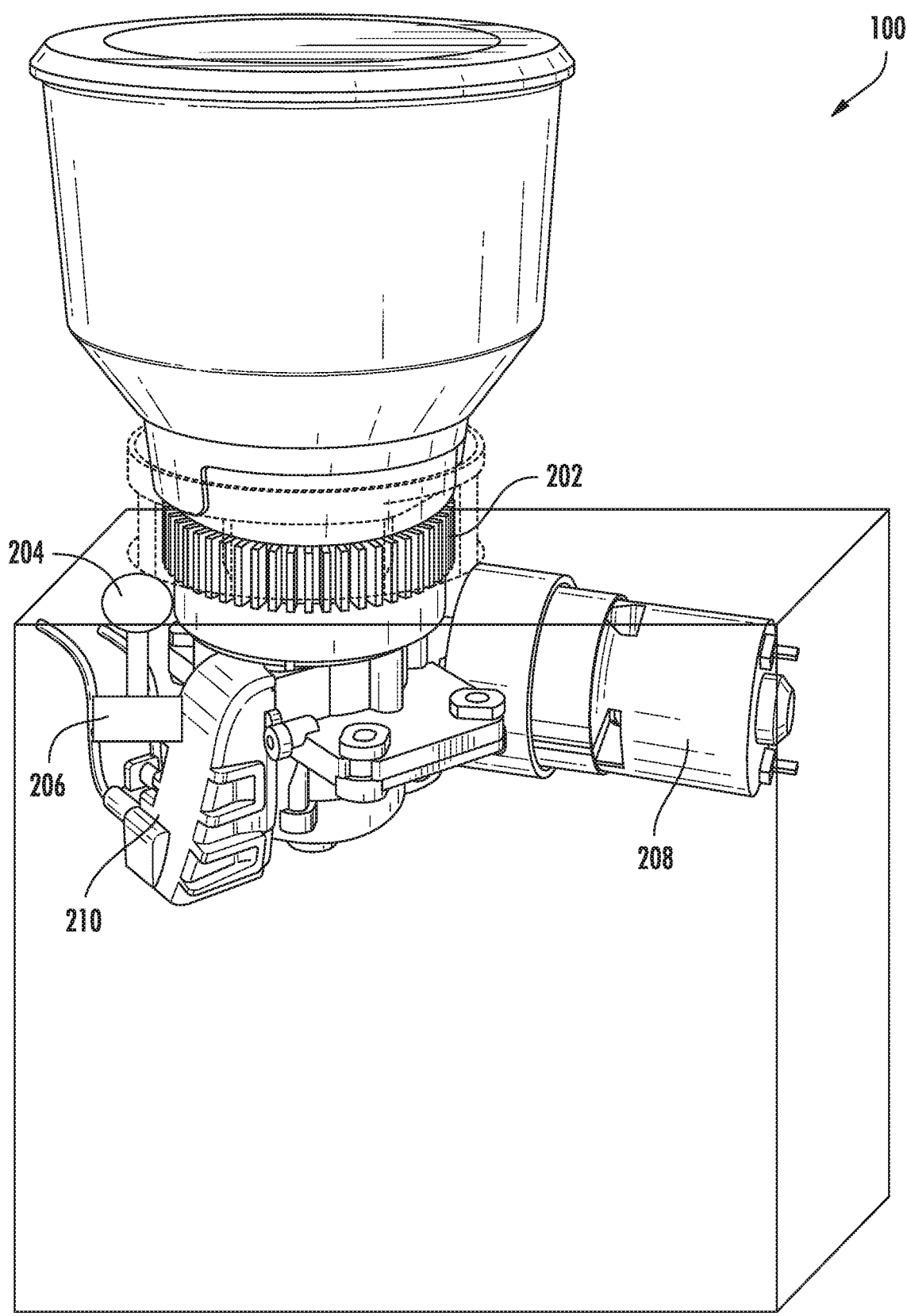
FIG. 2 is a perspective view of certain components of the example system of FIG. 1.
Figure 3:
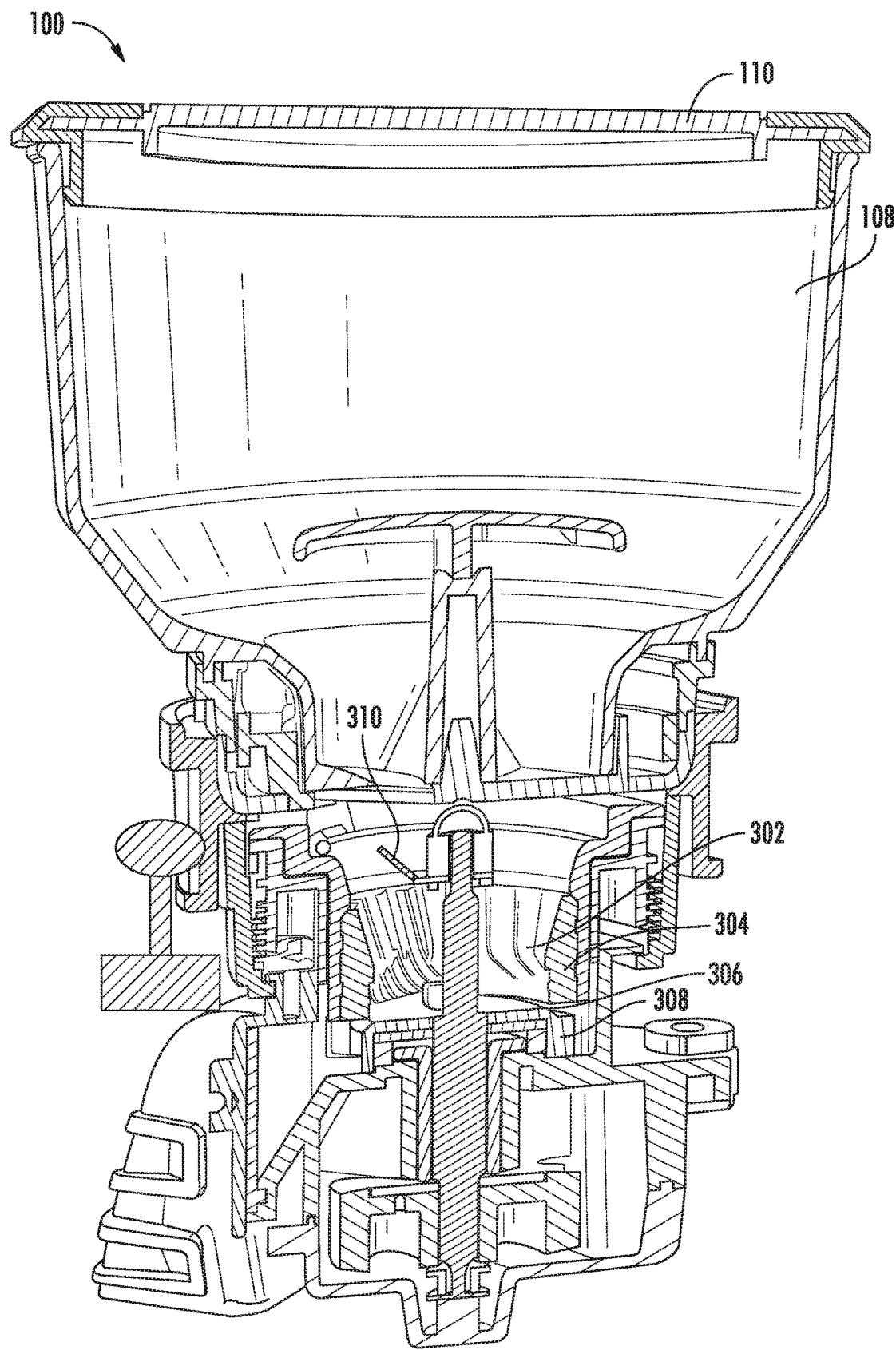
FIG. 3 is a section view of certain components of the example system of FIG. 1.

FIGS. 1 through 3 illustrate one example embodiment of system 100. In general, system 100 may include a bean hopper 108 with a removable cap 110, where coffee beans may enter the system 100. For example, cap 110 may be removed, and a user may pour coffee beans into the bean hopper 108. The beans may move through the system 100 by gravity and/or a rotating arm 310, pulling the coffee beans down from bean hopper 108 into the crusher blade chamber 302. The rotating arm 310 and crusher blade 304 may be rotated by motor 208 to crush the beans down to the size of a gap 306 along the bottom of the crusher blade chamber 302. When the coffee beans are ground small enough to fit through gap 306, the coffee grounds fall through gap 306 into a chute 210. The coffee grounds may then be pushed out chute 210 by a rotating gear 308. Rotating gear 308 may also be rotated by motor 208.

In the present embodiment, system 100 may have an upper adjustment ring 102 and a lower adjustment ring 202. The upper adjustment ring 102 may threadedly engage the lower adjustment ring 202, so as to rotate the lower adjustment ring 202 in unison with the upper adjustment ring 102. The lower adjustment ring 202 may couple to crusher blades 304 and may be configured to translate the crusher blades 304, e.g., vertically, so as to change the distance of gap 306 of system 100. Changing the distance of gap 306 changes the grinding size of system 100. Therefore, for example, the rotation of the upper adjustment ring 102 may be used to manually control the grinding size of system 100.

A potentiometer 206 may be operatively connected to the lower adjustment ring 202 via an additional gear 204. For example, the additional gear 204 may threadedly engage or mesh with the lower adjustment ring 202 so as to rotate in unison with the lower adjustment ring 202. Potentiometer 206 may be electrically connected to a controller 104. The controller 104 may be coupled to a user interface 106. The user interface, in general, may display the grinding size. For example, the user may twist the upper adjustment ring, which rotates the lower adjustment ring, moving the blade vertically in either direction, and rotating gear 204 attached to the potentiometer 206. Potentiometer 206 may then transmit an output voltage to the controller 104 which may convey the grinding size being selected by the user. Further, the controller 104 may use the grinding size to determine the grind duration. For example, the controller 104 may select the grinding duration based upon the distance of gap 306. In other words, the grinding duration may be directly proportional to and controlled by the grinding size.

Controller 104 may include a memory and one or more microprocessors, CPUs or the like, such as general or special purpose microprocessors operable to execute programming instructions or micro-control code associated with operation of system 100. The memory may represent random access memory such as DRAM or read only memory such as ROM or FLASH. In one embodiment, the processor executes programming instructions stored in memory. The memory may be a separate component from the processor or may be included onboard within the processor. Alternatively, controller 104 may be constructed without using a microprocessor (e.g., using a combination of discrete analog or digital logic circuitry; such as switches, amplifiers, integrators, comparators, flip-flops, AND gates, and the like) to perform control functionality instead of relying upon software. The controller 104 may contain stored values for each individual selectable grinding size corresponding to a respective grinding duration. For example, if a user selects a coarse grinding size, the controller may select, from the stored memory, a value that corresponds to a respective grind duration for the coarse setting selected by the user, so as to produce the correct weight of grounds.

Figure 4:
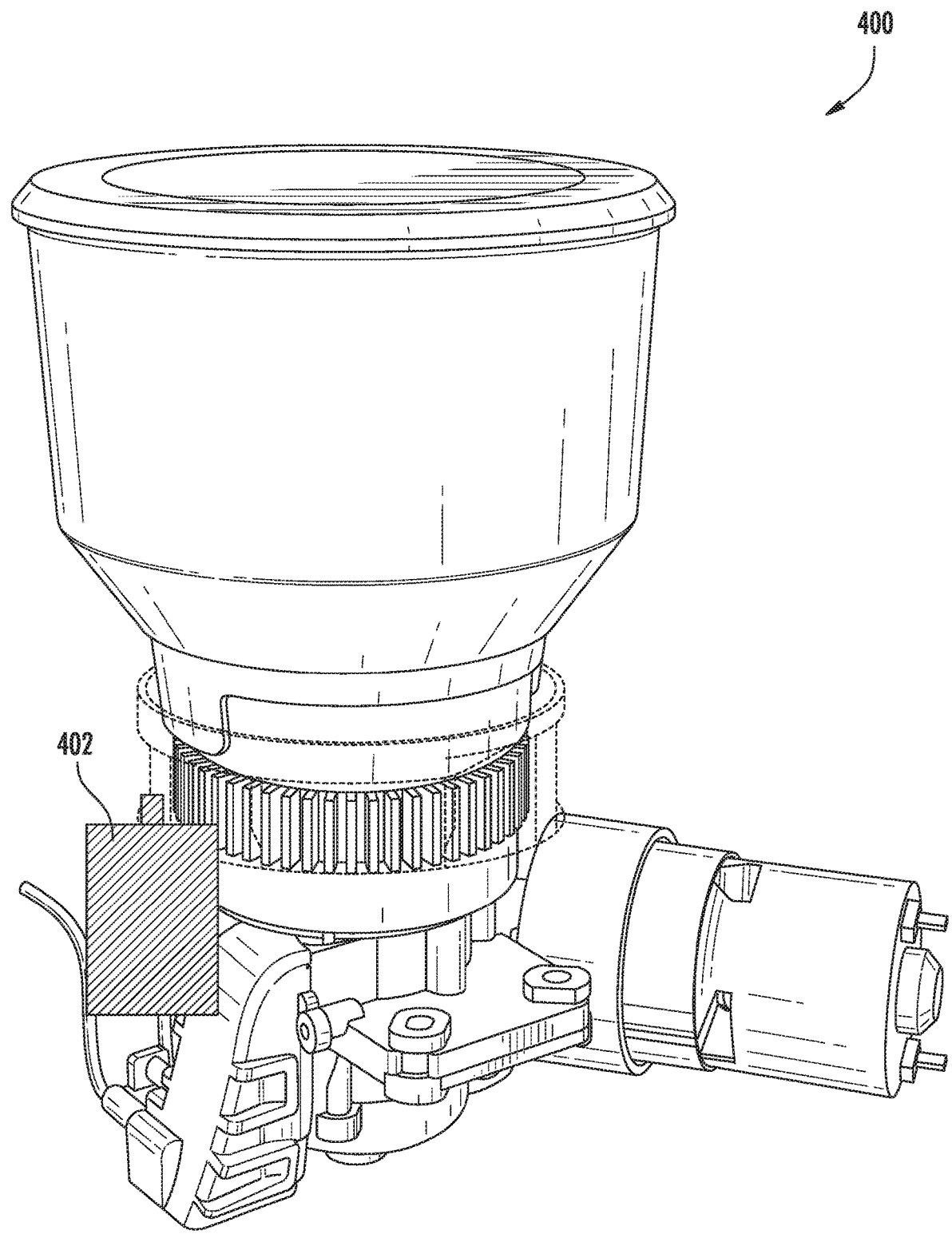
FIG. 4 is a perspective view of an example embodiment of the example system of FIG. 1.

FIG. 4 illustrates another example embodiment of the present disclosure. As shown, system 400 may include similar or common components as system 100 described above in the context of FIGS. 1 through 3. Repeated description of such components is omitted for the sake of brevity. In system 400, stepper motor 402 replaces gear 204 and potentiometer 206, as well as removing upper adjustment ring 102. System 400 may be an automatic system where stepper motor 402 may be directly rotatably coupled to lower adjustment ring 202. From user interface 106, a grinding size, or the size of gap 306, may be selected, and controller 104 may transmit a rotational instruction, such as a single or plurality of pulse inputs, to stepper motor 402. Stepper motor 402 may then automatically adjust the grinding size of system 400 by rotating lower adjustment ring 202. Controller 104 may contain stored values for each individual selectable grinding size corresponding to a respective grinding duration. For example, the user may input to the user interface 106 a fine grinding option, and the stepper motor 402 may adjust the grinding size to match the input. Then, using the grinding size selected, the controller 104 may select the grinding duration from the stored memory.

Figure 5:
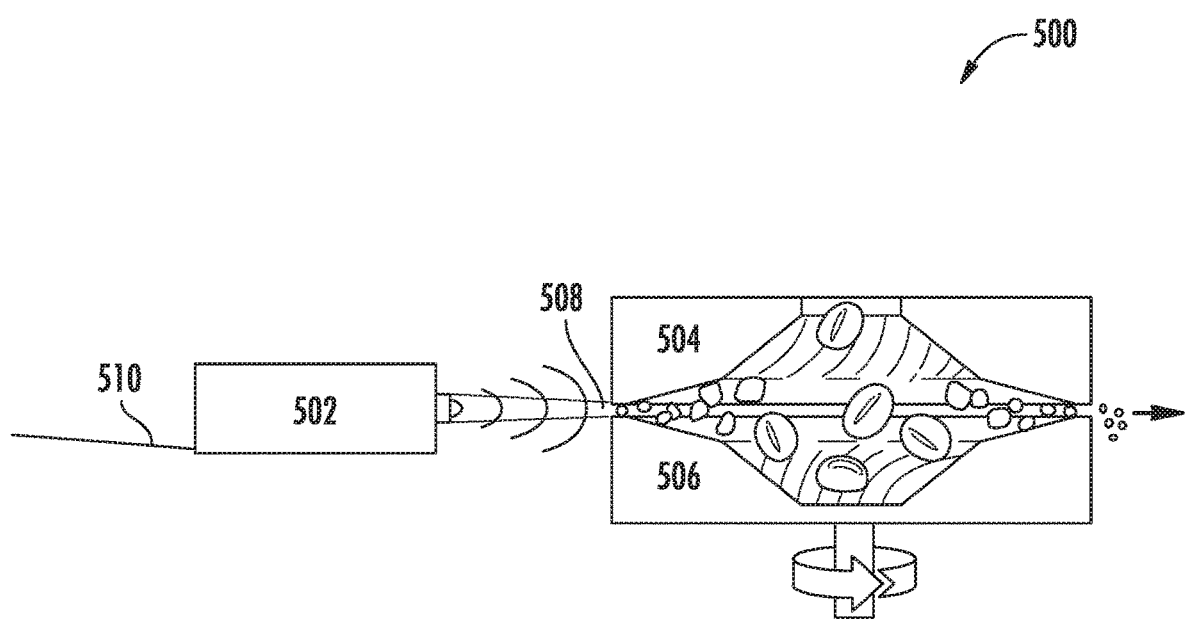
FIG. 5 is a perspective view of another example embodiment of FIG. 1.

Shown in FIG. 5, system 500 may include a sensor 502 such as an electronic and/or optical encoder, that may be configured to detect or measure the distance of gap 508 between an upper annular ring 504 and a lower annular ring 506. Most commonly, a system of annular rings such as this is referred to generally as a "flat burr" grinder. In general, sensor 502 may be configured differently and/or positioned elsewhere in the system 100. For instance, sensor 502 may include a linear sensor, such as an optical sensor or proximity sensor, positioned along the upper annular ring 504 or lower annular ring 506 to sense the relative length of an adjustment compared to the other ring. In one example embodiment, sensor lines 510 may be electrical or fiber optic wires connected to controller 104. For example, controller 104 may be connected to a photoelectric sensor, which may measure gap 508 between upper annular ring 504 and lower annular ring 506 of system 500. Additionally, system 500 may have other components similar to system 100 with regard to a bean hopper 108, cap 110, adjustment rings, e.g., upper adjustment ring 102 and lower adjustment ring 202, etc. In other words, system 500 may combine elements of system 100 and system 400 to produce another example embodiment of system 500.

FIGS. 1 through 5 depict systems for purposes of illustration and discussion. Those of ordinary skill in the art, using the disclosures provided herein, will understand that the systems discussed herein may be adapted, rearranged, expanded, omitted, or modified in various ways without deviating from the scope of the present disclosure. Moreover, although aspects of systems 200, 300, 400, 500 are explained using system 100 as an example, it should be appreciated that these embodiments and combinations thereof may be applied to any suitable system.

As may be seen in the above, an example embodiment of system 100 may include a potentiometer 206 to communicate current settings of the system 100 by sending a signal to a controller 104. The controller 104, with software, may automatically adjust the grinding duration. With the automatic adjustment of grinding duration, the system 100 can produce the proper weight of coffee grounds at all settings.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system, comprising:
   a grinder, comprising an upper annular ring and a lower annular ring; and
   a controller, configured for choosing a grind duration based upon a grind size value;
   an optical sensor, coupled to the upper annular ring and the lower annular ring, configured for measuring a distance between the upper annular ring and the lower annular ring; and
   wherein the distance corresponds to the grind size value.

2. The system of claim 1, wherein the optical sensor comprises one of a photoelectric sensor and a linear sensor.

3. The system of claim 1, further comprising:
   a sensor line connected between the controller and the optical sensor.

4. The system of claim 1, further comprising:
   a grind size adjustment ring configured for changing the grind size value of the grinder.

5. The system of claim 4, further comprising:
   a potentiometer rotatably coupled to the grind size adjustment ring,
   wherein the potentiometer is configured to output the grind size value, based upon a measured rotation of the grind size adjustment ring.

* * * * *